United States Patent [19]

Kundikoff

[11] 3,965,865
[45] June 29, 1976

[54] POULTRY CARRIER INCORPORATING DISPOSABLE FEED TRAYS

[76] Inventor: Peter Kundikoff, Rte. 4, Box 870, Escondido, Calif.

[22] Filed: June 5, 1975

[21] Appl. No.: 583,998

[52] U.S. Cl. .................................. 119/19; 229/6 A
[51] Int. Cl.² .................. A01K 31/18; B65D 11/00
[58] Field of Search .......................... 119/17–22, 119/30, 35, 40, 44, 43, 45, 51, 61; 206/515, 518, 509, 503; 229/6 A, 6 R, 30, 35, 43

[56] References Cited
UNITED STATES PATENTS

| | | | |
|---|---|---|---|
| 1,961,682 | 6/1934 | Brower | 119/19 |
| 3,126,867 | 3/1964 | Kundikoff | 119/17 |
| 3,200,988 | 8/1965 | Chelbor | 206/509 |
| 3,326,186 | 6/1967 | Doll | 229/6 A |
| 3,641,983 | 2/1972 | Keen et al. | 119/17 |
| 3,667,647 | 6/1972 | Van Daalen | 206/515 |
| 3,687,330 | 8/1972 | Herolzer | 119/19 |
| 3,696,966 | 10/1972 | Herolzer | 229/6 A |

*Primary Examiner*—Louis G. Mancene
*Assistant Examiner*—Peter K. Skiff
*Attorney, Agent, or Firm*—Brown & Martin

[57] ABSTRACT

A poultry carrier includes topless and bottomless separators defined by open beam frusto-pyramidal construction. The vertical beams of the separators are spaced such that a chick would not be able to squeeze through in the event of rupture of a single vertical beam. The bottom edges of the separators are scalloped for penetration into sawdust or chick matting in which the chicks are normally shipped. The top and bottom enclosures of the separators are removable and usable as feeders during the infancy of the chicks. The sides of the feeders are hingedly connected and include chick toe-guards disposed along the edges thereof. Mating male and female parts in the top and bottom enclosures permit the stacking of separator combinations for purposes of shipment.

8 Claims, 6 Drawing Figures

POULTRY CARRIER INCORPORATING DISPOSABLE FEED TRAYS

BACKGROUND OF THE INVENTION

In the art of raising chickens, it is the conventional practice for the poultry ranchers to purchase chicks from a hatchery and raise them in a poultry house. Chicks are quite sensitive in their infancy and precautions must be taken to insure their survival during transportation from the hatchery to the poultry ranch.

Since chicks are generally purchased in substantial quantity, arrangements are necessary to transport them in quantities of hundreds or even thousands at a time from the hatchery to the poultry ranch. In transporting quantities of this magnitude, the chicks must be stacked in rather closely confined relationship. The close quarters cause significant losses due to suffocation. Therefore, a requirement in transporting chicks in large numbers is adequate ventilation of the individual chick carriers. Furthermore, it is frequently necessary to check on the condition of the chicks during transit. The inspection should be accomplished with the least amount of disturbance to the chick.

The chicks must be fed shortly after delivery. This is generally accomplished providing feed in a number of feed trays to avoid excessive crowding around an individual feed tray. Accordingly, in the prior art, feed trays have been associated with the chick carriers, and are removable for use as feed trays. A problem with such use has been contamination of the trays by communicable bacteria.

Another aspect of the transport of chicks is the tendency of the group to cannibalize a member that may have been injured. This has been a problem associated with conventional feed trays that often times cause foot injuries to the young chicks. When the other chicks sense that one of their group is wounded, they may descend upon that member and literally cannibalize him.

Another problem associated with chick transporting relates to the fact that the chicks produce substantial droppings within their carriers. Use of degradable substances provides conditions which permit germ breeding. It is highly advantageous to transport the chicks in the most antiseptic conditions possible.

The prior art is characterized by a number of carriers designed to transport chicks in large numbers. All present and prior art carriers, however, are deficient in the one or more of the above mentioned categories in the handling of chicks. One such carrier is comprised of a pair of side-by-side cup shaped containers topped by a flanged lid. This carrier is deficient in that it provides inadequate ventilation for the chicks, there is no provision for the chick droppings, and it is an expensive carrier and cannot be considered disposable.

Yet another device is comprised of a fiberboard compartmentalized, perforated container with a swingable lid. This device is deficient in that there is no provision for dropping disposal, and consequently, the fiberboard is subject to degradation and becomes a germ breeder. Furthermore, there is no separate feed tray provided with this device.

In yet another device, a fiberboard container is laminated with foil on its inner surface. This device, however, does not represent any substantial improvement over the previously mentioned devices, since ventilation is inadequate and there is no provision for dropping disposal.

There are a number of other devices represented in the prior art, and most of them are slight modifications of the previously described embodiments. None of them are particularly effective in providing the optimum carrier which is durable, safe and antiseptic. Therefore, there is a need for a poultry carrier that is durable, to permit multiple stacking, clean to avoid germ breeding, carriers its own feed tray that is disposable, and provides adequate ventilation for the chicks during transport.

SUMMARY OF THE INVENTION

It is an object of the invention to provide a new and improved poultry carrier.

Another object of the invention is to provide a new and improved poultry carrier with a removable feed tray.

Another object of the invention is to provide a new and improved poultry carrier that permits adequate ventilation for the chicks.

Another object of the invention is to provide a new and improved poultry carrier that reduces foot injuries to the chicks.

Another object of the invention is to provide a new and improved poultry carrier that is nondegradable.

Another object of the invention is to provide a new and improved poultry carrier, incorporating removable and disposable feed trays.

Another object of the invention is to provide a new and improved poultry carrier that is inexpensive and durable.

Another object of the invention is to provide a new and improved poultry carrier that permits multiple stacking of individual transporters.

Another object of the invention is to provide a new and improved poultry carrier in which the separators are reusable.

Another object of the invention is to provide a new and improved poultry carrier that prevents droppings from accumulating on the separators.

Another object of the invention is to provide a new and improved poultry carrier that permits viewing the condition of the chicks without disturbing them.

Another object of the invention is to provide a new and improved poultry carrier characterized by a maximum strength versus weight ratio.

Another object of the invention is to provide a new and improved poultry carrier in which several individual separators are press-fit into the removable feed trays for greater structural integrity.

In accordance with the above objects, the poultry carrier is characterized by open beam frusto-pyramidal individual separators. The vertical beams of the separators are spaced such that in the event of breakage of an individual beam, there is insufficient space for a chick to escape from the separator. The separators are open at the top and bottom, and the bottom edges are scalloped to permit penetration of the sawdust or chick matting disposed beneath the chick separators.

Top and bottom enclosures for the separators are in the form of removable trays which can be used as feed trays. The bottom enclosure is of a greater area than the top enclosure due to the inward taper of the separator from the bottom to the top thereof. The enclosures are provided with corrugated sides for strength. The sides pivot about a hinge. Flaps are provided on two of the sides and are hingedly connected to those sides. Molded buttons are received in mating holes on the adjacent sides for structural security. The terminal edges of all of the sides are provided with a bead that runs the entire length of each side. The bead functions primarily as a toe-guard and reduces injuries to the sensitive feet of the chicks.

The trays include means for vertically stacking carriers for transport. The means is characterized by a series of alternating grooves and ribs formed in the upper and lower trays. The grooves formed in an upper tray function as a male part that is received in the ribs formed in a subtending tray. The ribs grooves divide the individual trays into quadrants. The edges of the separators are received in selected grooves of upper and lower trays.

In an exemplary embodiment, four separators are placed between a top and bottom enclosure. The adjacent bottom edges of adjacent separators are received in a common groove in the bottom enclosure in a side-by-side relationship. There are grooves formed adjacent the sides of the enclosures around the entire perimeter thereof to accommodate the exterior facing edges of the separators. The separators are sized so that when four separators are pressed into the bottom enclosure they form a frictional engagement relationship with the walls of the grooves. The frictional engagement produces a strong and compact combination.

The separators present a minimum surface area and are fabricated from an injection molded plastic material. They are relatively durable and may be reused as desired. The minimum surface area and since the bottom edges of the separators are spread apart further than the top edges are, chick droppings tend not to contact the beams and consequently do not adhere to the separators. Rather, the chick droppings as well as the fluid eliminated by the chicks, passes into the sawdust or matting below. The enclosures are fabricated from a relatively thin, on the order of 1/32 of an inch or less, plastic material and are sufficiently inexpensive so as to be disposable after their use as feed trays for an individual group of chicks have expired.

The above and other objects of the invention will be apparent as the description continues and when read in conjunction with the appended drawings.

DETAILED DESCRIPTION OF THE DRAWINGS

Figure 1:
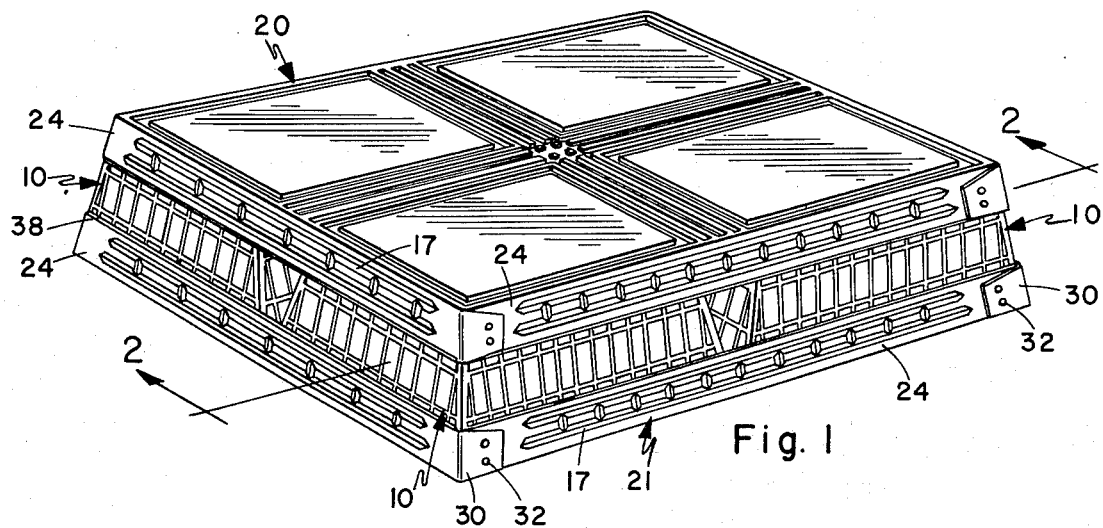
FIG. 1 is a perspective view of the assembled structure.
Figure 2:
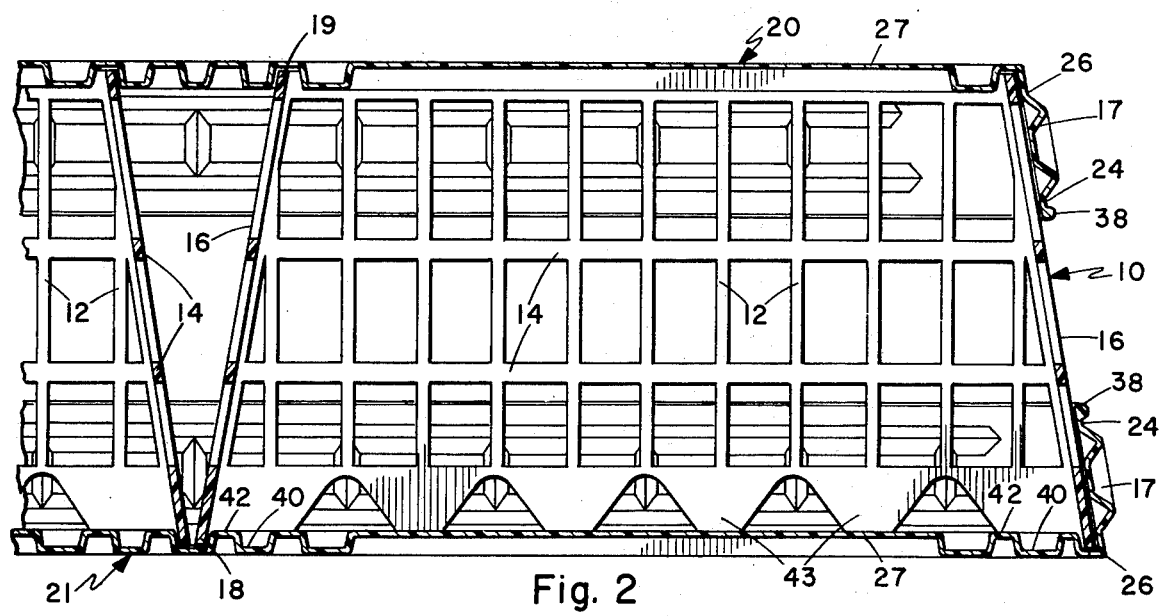
FIG. 2 is an enlarged sectional view taken on line 2—2 of FIG. 1.
Figure 3:
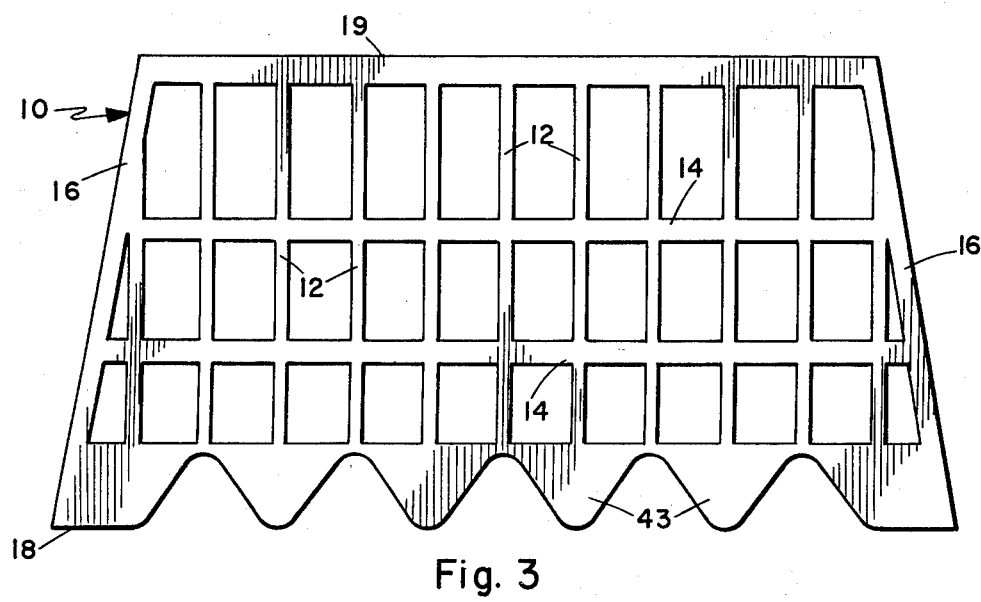
FIG. 3 is a side elevation view of one separator unit.
Figure 4:
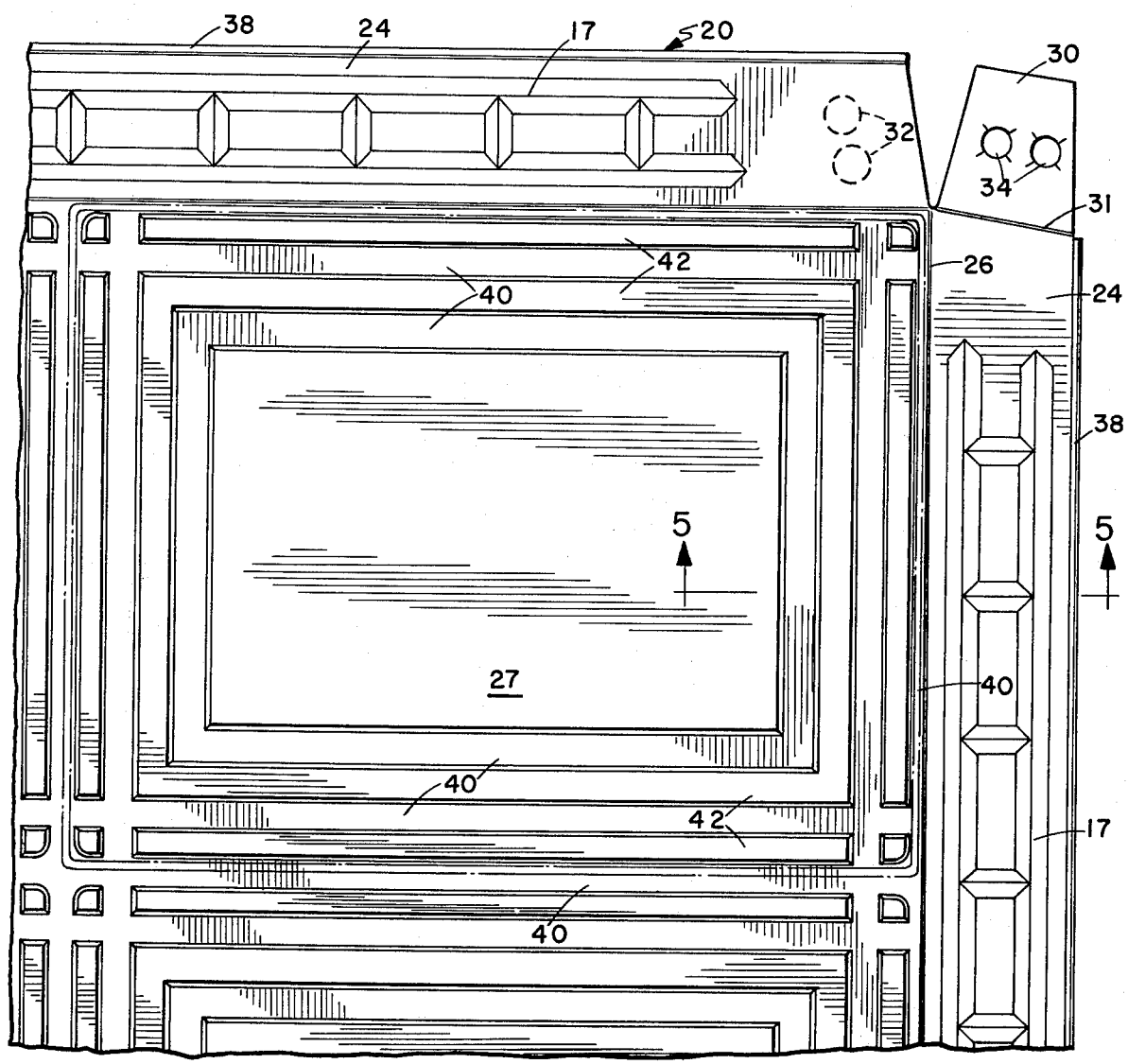
FIG. 4 is an enlarged top plan view of a portion of the lower tray.
Figure 5:
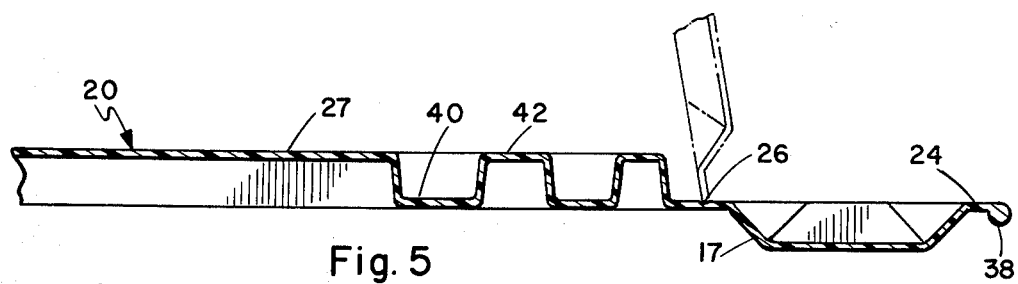
FIG. 5 is an enlarged sectional view taken on line 5—5 of FIG. 4.
Figure 6:
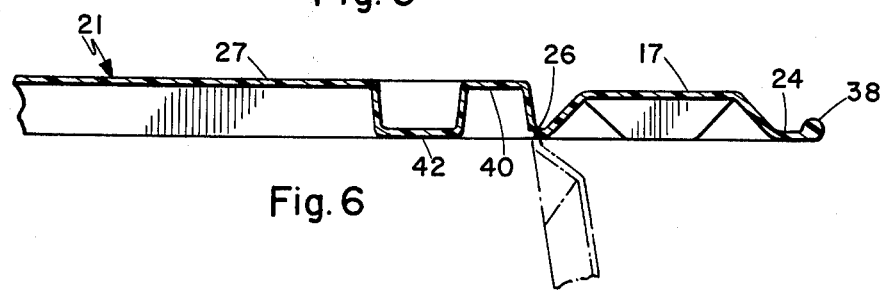
FIG. 6 is a similar sectional view of a comparable portion of the upper tray.

An exemplary embodiment of the invention is characterized by frusto-pyramidal open beam separators 10. The separators 10 are four walled. Each wall is constructed of a series of spaced, parallel, integrally molded vertical beams 12. The beams 12 are spaced such that if an individual beam is ruptured, there is insufficient space for a chick to squeeze through the area defined by the next adjacent unbroken beams 12. Horizontal or cross-beams 14 are molded to the vertical beams to insure structural integrity of the separators 10. Somewhat thicker corner beams 16 are provided at each of the wall intersections to further increase the structural security of the separators 10. It is to be noted that the separators 10 are open at the top and bottom. Furthermore, the space between the bottom edges 18 is greater than the space between the top edges 19 because of the frusto-pyramidal geometry. The resultant slope of the sides insures that the chick droppings and eliminated fluids do not normally contact the beams 12 and therefore, do not adhere thereto. The separators are relatively rigid. They can be fabricated from an injection molded plastic material and are reusable many times. Since droppings do not adhere, there is very little clean-up problem involved in reusing the separators 10. The open beam construction, furthermore, promotes a safe and healthy journey for the chicks. Since the chicks are generally transported in very large numbers, it is necessary for there to be adequate ventilation of the individual separators. The open beam construction, therefore, permits the maximum passage of air into the individual separators, while at the same time insuring that the individual chick is securely confined therein. It should also be noted that the open beam construction makes it possible to observe the condition of the chicks during transit without disturbing their tranquility.

During transit the separators 10 are packed in sets of four between top and bottom enclosures 20, 21 to form a poultry carrier. The enclosures 20, 21 are removable and used as feed trays upon arrival at the poultry ranch. The bottom enclosure 21 has a greater area than the top enclosure 20 because the bottom enclosure 21 must enclose a greater area. The enclosures 20, 21 are defined by sides 24 and hinges 26 connect them to the base 27 area of the enclosures. The sides 24 have corrugations 17 to provide for greater strength and two sides includes flaps 30 that are connected by hinges 31 to the sides 24. The flaps 30 include molded buttons 32 that are designed to be received in mating holes 34 in the adjacent sides 24. In the assembled condition, the sides 24 are fastened together and closely confine the upper and lower portions of the separators 10. As illustrated in the drawings, the sides 24 connected to the bottom enclosure 21 are disposed at an acute angle to the base 27 of that enclosure. The sides 24 of the top enclosure 20 are disposed at an obtuse angle with respect to the base 27 of that enclosure. A bead or foot guard 38 is provided along the entire terminal edges of the sides 24. The foot guard 38 functions to prevent injury to the sensitive feet of the chicks during the frequent feedings. It has been observed that when a chick receives an injury and bleeds, the other members of the group have a tendency to inflict further injury upon him and even cannibalize him. Thus, the foot guard 38 reduces injury and therefore, increases the survival rate of the chicks.

The enclosures 20, 21 are provided with a means to permit multiple stacking of the carriers. The means comprises a series of parallel and alternating grooves 40 and ribs 42 and divides the top and bottom enclosures 20, 21 into quadrants. The grooves and ribs 40, 42 divide the trays into quadrants each designed to retain an individual separator 10. The ribs 42 of the top enclosure 20 function as the female part of the stacking means, and the grooves 40 of the top enclosure 20 functions as the male part of the stacking means. Conversely, the grooves 40 of the bottom enclosure 21 function as the male part of the stacking means, and the ribs 42 function as the female part of the stacking means. For added security, additional grooves 40 and ribs 42 are provided adjacent the sides 24 of the enclosures 20, 21. The disposition of ribs and grooves insures that a multiplicity of carriers may be vertically stacked without fear of relative sliding or shaking free.

Sawdust or chick matting may be distributed throughout the bottom enclosure 21 and the separators 10 are placed thereupon. The bottom edges 18 of the separators 10 have scallops 43 to penetrate deeply into the matting for secure positioning within the enclosure 21.

As illustrated in the drawings, the grooves of both the top and bottom enclosures 20, 21 function to accommodate the top and bottom edges of the separators 10. A central groove 40 of the bottom enclosure 21 accommodates the adjacent edges of two separators 10 in a side-by-side relationship. Each of the separators 10 have two adjacent edges commonly received in a groove 40 along with adjacent edges of two adjacent separators. The exterior facing edges of each of the separators 10 are accommodated in the perimeter grooves 40.

The enclosure 20, 21 may be fabricated from a light thermo-forming plastic on the order of 1/32 of an inch or less. Such enclosures are quite inexpensive and may be disposed of after they are no longer needed as feeding trays. The disposability of the trays insure that each new group of chicks will use their own trays and not be exposed to any germs or bacteria that may have been deposited by a previous group of chicks. Furthermore, the use of a plastic material as opposed to an organic or biodegradable material insures that the enclosures 20, 21 will not become germ breeders.

Having described my invention, I now claim:

1. A poultry carrier for chicks and the like comprising:

a topless and bottomless open beam frusto-pyramidal separator to house the chicks, enclosures forming removable tops and bottoms for said separators, means connected to said enclosures to permit vertical stacking of the enclosed separators for transport including, mating male and female parts in a bottom enclosure of a first separator and a top enclosure of a subtending separator, said male and female parts dividing the top and bottom enclosures into quadrants, adjacent bottom edges of said separators being commonly received in a side by side relationship in an interior groove formed by a male part, grooves running adjacent the edges of said enclosures to accommodate the exterior facing edges of said separators, the top edges of said separators being received in grooves formed by the male parts of said top enclosure.

2. The poultry carrier of claim 1, wherein:
said enclosures are usable as feed trays after removal from the separators.

3. The poultry carrier of claim 2, wherein:
said enclosures are fabricated from a relatively thin plastic material and are disposable after a single group of chicks no longer require their use.

4. The poultry carrier of claim 1, wherein said enclosures comprise:
hinged sides extending over said separators,
flaps for locking adjacent sides together, and
fastening means connected to said flaps and adapted for reception into female receivers in adjacent sides.

5. The poultry carrier of claim 1, wherein said enclosures further comprise:
foot guards having an extended surface area disposed on the terminal edges of said enclosures.

6. The poultry carrier of claim 1, wherein:
said bottom enclosure is of a larger surface area than said top enclosure.

7. The poultry carrier of claim 1, wherein said separators comprise:
spaced vertical beams disposed such that the space between three consecutive beam is insufficient to permit a chick to squeeze through in the event a center beam is ruptured.

8. The poultry carrier of claim 1, wherein:
the bottom edges of said separators have segments adapted to penetrate randomly dispersed particulate matting disposed on said bottom enclosure.

* * * * *